United States Patent Office 3,684,456
Patented Aug. 15, 1972

3,684,456
DETERMINATION OF ALCOHOL
Paul W. McConnaughey, Pittsburgh, Pa., assignor to Mine Safety Appliances Company, Pittsburgh, Pa.
No Drawing. Filed Jan. 8, 1970, Ser. No. 1,547
Int. Cl. C09k 3/00; G01n 31/22
U.S. Cl. 23—254 R
4 Claims

ABSTRACT OF THE DISCLOSURE

A colorimetric detector tube for determining alcohol in the breath contains a reagent of granular silica gel impregnated with a solution of a hexavalent chromium compound in a mixture of an acid of pentavalent phosphorous with sulfuric acid or perchloric acid.

---

There is a continually increasing need and acceptance for simple apparatus to be used in the field for determining the alcohol content in exhaled alveolar breath to indicate the concentration of alcohol in the blood. A variety of such devices are well known in which the exhaled breath sample is collected and then passed through an elongate bed of solid reagent that changes color when contacted with alcohol. The reagent is contained in a transparent tube and as a sample is passed through the bed a color or stain develops lengthwise of the bed, the length of which is dependent on the amount of alcohol in the sample.

In the conventional reagent, granular silica gel is impregnated with sulfuric acid and sodium dichromate to form a reagent that turns color from yellow to dark green. The sulfuric acid, however, combines rapidly with water vapor in the exhaled breath forming a liquid phase that absorbs alcohol and results in a color change over only a short length of the bed that is not very proportional to the amount of alcohol in the sample. Since a substantial change in the amount of alcohol made only a small change in the stain length, small changes cannot be accurately determined; that is, the tube has a low sensitivity.

In my U.S. Pat. No. 3,455,654, it is disclosed that a reagent of silica gel impregnated with a hexavalent chromium compound and a pentavalent phosphorus acid is responsive to alcohol and in a detector tube develops a long stain length that is highly proportional to the amount of alcohol in the sample and is quite insensitive to variations of water vapor content in the sample. This indicator changes color on contact with alcohol vapor from yellow to light green. The light green color is undesirable for alcohol-in-breath detectors used in the field as the end point may be difficult to see in poor light conditions and subjective errors can arise when the color intensity of yellow and green are similar. That is, it is much preferred to have a stain that is much darker than the unreacted reagent, as well as a different color.

Accordingly, it is an object of this invention to provide a reagent and detector tube especially suited for determining alcohol in the breath. Another object is to provide a detector tube responsive to alcohol that develops a highly distinct end point and has a high sensitivity to varying amounts of alcohol vapor.

The reagent of this invention comprises a hexavalent chromium compound and a mixture of an acid of pentavalent phosphorus with sulfuric acid or perchloric acid on an inert granular carrier, such as silica gel. The reagent is disposed in a glass or transparent tube of small diameter, the ends of which are sealed, as described in Littlefield, U.S. Pat. No. 2,174,349. The detector tube is used by breaking the seals and passing the breath sample through the tube.

The hexavalent chromium compound may be supplied as chromium trioxide ($CrO_3$) or as a soluble chromate or dichromate, e.g., potassium (or other alkali metal) chromate ($K_2CrO_4$) or dichromate ($K_2Cr_2O_7$). The phosphoric acid may be orthophosphoric acid ($H_3PO_4$) or metaphosphoric acid ($HPO_3$) or other acid of pentavalent phosphorus. The acids used are substantially concentrated, that is, about 95–98% sulfuric acid, about 70% perchloric acid and about 85% orthophosphoric acid. Some additional water can be tolerated, but it is preferred not to have more than about 10% in excess of that in the concentrated acids. Phosphoric acid is the major component of the acid mixture (over 50% by volume) and sulfuric acid or perchloric acid is a minor component. Preferably, the acid mixture contains between about 60 and 90% by volume concentrated phosphoric acid, the remainder being sulfuric acid and/or perchloric acid.

The ingredients may be used in any proportions up to the amount of chromate compound that will dissolve in the acid, and up to the amount of acid that can be mixed with the silica gel without it appearing to have a surface wetness, suitably between about 0.07 and 0.35 gram of hexavalent chromium (between about 0.2 and 1.0 gram of the preferred $K_2Cr_2O_7$) and between about 20 and 35 ml. of acid per 100 grams of dry silica gel. A preferred reagent that shows an exceptionally clear end point with high color contrast contains 25 ml. of concentrated (85%) orthophosphoric acid, 7.5 ml. of concentrated (70%) perchloric acid and 0.6 gram of potassium bichromate carried on 100 grams of HCl or $HNO_3$ purified silica gel having a pore volume of about 0.4 cc. (to water) per gram.

The reagent may be prepared by dissolving the chromate compound in the acid. The silica gel is added to the solution and mixed until the gel is of a uniform yellow color. The silica gel is suitably between about 28–65 mesh.

Detector tubes having 5.0 mm. I.D. with a reagent bed depth of 25 mm., held in place by end plugs of Fiberglas cloth, were prepared using different acids or acid mixtures. The reagents contained 0.6 g. of $K_2Cr_2O_7$ and 32.5 ml. of acid per 100 grams of silica gel. An 800 ml. breath sample, moisture saturated, containing 130 p.p.m. ethanol or 390 p.p.m. ethanol were passed through each tube with the following result:

| Acid used (volume), percent of concentrated acids | Stain length | | Color change |
|---|---|---|---|
| | 130 p.p.m. $C_2H_5OH$ | 390 p.p.m. $C_2H_5OH$ | |
| $H_3PO_4$ | 10 | 19 | Yellow to light green. |
| $H_2SO_4$ | 6 | 8 | Yellow to dark blue-green. |
| 67% $H_3PO_4$·33% $H_2SO_4$ | 8 | 13 | Yellow to dark green. |
| 75% $H_3PO_4$·25% $HClO_4$ | 8 | 14 | Yellow to medium green. |
| $HClO_4$ | 6 | 8 | Yellow to white. |

It will be observed that only a 2 mm. change of stain length resulted from the change of alcohol concentrations when using sulfuric or perchloric acid alone, while a 5–6 mm. change resulted when using mixtures with phosphoric acid. The use of the mixed acids provided, in addition to high sensitivity, a highly visible and distinct end point.

The end point and color contrast is somewhat further improved when the indicator contains a trace amount of arsenic trioxide, suitably between about .01 and .09 gram, preferably about 0.03 gram/100 grams of carrier, and iodine, suitably between about .004 and .04 gram, preferably about 0.018 gram/100 grams of carrier.

The reagent of this invention does not produce a stain with atmosphere containing 0-1000 p.p.m. of acetone, a component that may be present in the breath of diabetics. Sulfuric acid indicators, such as that of the example set forth above, do produce a stain with 1000 p.p.m. acetone that is identical in color to the stain produced with alcohol.

I claim:

1. A colorimetric reagent responsive to ethanol vapor consisting essentially of silica gel impregnated with a solution of a hexavalent chromium compound in a mixed acid solvent containing a major proportion of a pentavalent phosphoric acid and the remainder being perchloric acid.

2. A reagent according to claim 1 containing between about .01 and .09 gram of arsenic trioxide and between about .004 and .04 gram of iodine per 100 grams of silica gel.

3. A reagent according to claim 1 having a solution of between about 0.07 and 0.35 gram of hexavalent chromium compound in between about 20 and 35 ml. of acid solvent per 100 grams of silica gel.

4. A reagent according to claim 3 consisting essentially of a solution of potassium dichromate in a solvent of about 75% orthophosphoric acid and 25% perchloric acid.

References Cited

UNITED STATES PATENTS

| 2,174,349 | 9/1939 | Littlefield | 23—232 |
| 2,939,768 | 6/1960 | Grosskopf | 23—232 |
| 3,455,654 | 7/1969 | McConnaughey | 23—232 |

OTHER REFERENCES

Antony et al., Chem. Abstr., 50, 1427f (1956).

MORRIS O. WOLK, Primary Examiner

R. M. REESE, Assistant Examiner

U.S. Cl. X.R.

23—232 R; 252—408